United States Patent
Kojima

(10) Patent No.: US 7,493,323 B2
(45) Date of Patent: Feb. 17, 2009

(54) DOCUMENT GROUP ANALYZING APPARATUS, A DOCUMENT GROUP ANALYZING METHOD, A DOCUMENT GROUP ANALYZING SYSTEM, A PROGRAM, AND A RECORDING MEDIUM

(75) Inventor: Yuichi Kojima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 392 days.

(21) Appl. No.: 11/063,636

(22) Filed: Feb. 24, 2005

(65) Prior Publication Data

US 2005/0192949 A1    Sep. 1, 2005

(30) Foreign Application Priority Data

Feb. 27, 2004    (JP)    ............................. 2004-054838

(51) Int. Cl.
*G06F 17/30*    (2006.01)

(52) U.S. Cl. ............................................. 707/6; 707/2

(58) Field of Classification Search ............... 707/1–10, 707/100–104.1, 200–206; 715/503, 236; 705/22, 24.34; 709/202, 203
See application file for complete search history.

(56) References Cited

U.S. PATENT DOCUMENTS

| | | | | |
|---|---|---|---|---|
| 6,202,060 | B1 * | 3/2001 | Tran | 707/3 |
| 6,981,040 | B1 * | 12/2005 | Konig et al. | 709/224 |
| 2003/0126139 | A1 * | 7/2003 | Lee et al. | 707/100 |
| 2003/0182310 | A1 * | 9/2003 | Charnock et al. | 707/104.1 |
| 2007/0088614 | A1 * | 4/2007 | Huo | 705/26 |

FOREIGN PATENT DOCUMENTS

JP    9-128409    5/1997

* cited by examiner

*Primary Examiner*—Diane Mizrahi
(74) *Attorney, Agent, or Firm*—Dickstein Shapiro LLP

(57) ABSTRACT

Disclosed are a document group analyzing apparatus, a document group analyzing method, a document group analyzing system, a program, and a recording medium that identify where business success and failure are branched by separating documents having causal relation between success cases and failure cases, and displaying information for analyzing factors for success and failure. Therein, a document is searched for in a document database by a searching condition, documents, the document database holding a document group having causal relation based on kinds of documents. The document searched for, and documents having causal relation to the document that is searched for are extracted from the document database. The extracted documents having causal relation are divided into groups. Documents belonging to each group are classified by the kinds of the documents.

9 Claims, 22 Drawing Sheets

FIG.3

FORM A: CUSTOMER INFORMATION

| DATA ITEM | KEY | VALUE |
|---|---|---|
| DOCUMENT ID | OFF | |
| FORM TYPE | OFF | A |
| CUSTOMER NAME | OFF | |
| INVESTIGATOR | OFF | |
| INVESTIGATE DATE | OFF | |
| SCALE | ON | |
| TYPE OF INDUSTRY | ON | |
| AREA | ON | |
| COPY | ON | |
| FAX | ON | |
| PRINTER | ON | |
| PC | ON | |
| LAN | ON | |
| OTHERS | OFF | |

FIG.4

FORM B: PROPOSAL

| DATA ITEM | KEY | VALUE |
|---|---|---|
| DOCUMENT ID | OFF | |
| FORM TYPE | OFF | B |
| CAUSAL DOCUMENT ID | OFF | |
| PROPOSER | OFF | |
| PROPOSE DATE | OFF | |
| PROPOSAL SCALE | ON | |
| COPY | ON | |
| FAX | ON | |
| PRINTER | ON | |
| PC | ON | |
| COMPETITION | ON | |
| PROPOSAL | OFF | |

FIG.5

FORM C: ESTIMATE

| DATA ITEM | KEY | VALUE |
|---|---|---|
| DOCUMENT ID | OFF | |
| FORM TYPE | OFF | C |
| CAUSAL DOCUMENT ID | OFF | |
| CAUSAL DOCUMENT ID | OFF | |
| ESTIMATE DATE | OFF | |
| ESTIMATE SCALE | ON | |
| ESTIMATOR | OFF | |
| ESITIMATE | OFF | |

FIG.6

FORM D: CONTRACT

| DATA ITEM | KEY | VALUE |
|---|---|---|
| DOCUMENT ID | OFF | |
| FORM TYPE | OFF | D |
| CAUSAL DOCUMENT ID | OFF | |
| CAUSAL DOCUMENT ID | OFF | |
| CAUSAL DOCUMENT ID | OFF | |
| CONTRACT DATE | OFF | |
| PERSON IN CHARGE | OFF | |
| CONTRACT | OFF | |

FIG.7

FORM E: INVOICE

| DATA ITEM | KEY | VALUE |
|---|---|---|
| DOCUMENT ID | OFF | |
| FORM TYPE | OFF | E |
| CAUSAL DOCUMENT ID | OFF | |
| CAUSAL DOCUMENT ID | OFF | |
| CAUSAL DOCUMENT ID | OFF | |
| CAUSAL DOCUMENT ID | OFF | |
| INVOICE DATE | OFF | |
| PERSON IN CHARGE | OFF | |
| INVOICE | OFF | |

FIG.8

FORM A: CUSTOMER INFORMATION

| DATA ITEM | KEY | VALUE |
|---|---|---|
| DOCUMENT ID | OFF | 11059 |
| FORM TYPE | OFF | A |
| CUSTOMER NAME | OFF | XXX, INC. |
| INVESTIGATOR | OFF | TARO SUZUKI |
| INVESTIGATE DATE | OFF | 2002/12/3 |
| SCALE | ON | 1-5 EMPLOYEES |
| TYPE OF INDUSTRY | ON | HOME/EQUIPMENT INSTALLATION |
| AREA | ON | YY CITY, CHIBA PREF. |
| COPY | ON | PRESENT |
| FAX | ON | PRESENT |
| PRINTER | ON | PRESENT |
| PC | ON | PRESENT |
| LAN | ON | PRESENT |
| OTHERS | OFF | |

FIG.9

FORM B: PROPOSAL

| DATA ITEM | KEY | VALUE |
|---|---|---|
| DOCUMENT ID | OFF | 21201 |
| FORM TYPE | OFF | B |
| CAUSAL DOCUMENT ID | OFF | 11059 |
| PROPOSER | OFF | TARO SUZUKI |
| PROPOSE DATE | OFF | 2003/05/10 |
| PROPOSAL SCALE | ON | 1 - 2 MILLION YEN |
| COPY | ON | 0 |
| FAX | ON | 0 |
| PRINTER | ON | 1 |
| PC | ON | 2 |
| COMPETITION | ON | COMPANY C |
| PROPOSAL | OFF | [ATTACHED FILE] |

FIG.10

FORM C: ESTIMATE

| DATA ITEM | KEY | VALUE |
|---|---|---|
| DOCUMENT ID | OFF | 33201 |
| FORM TYPE | OFF | C |
| CAUSAL DOCUMENT ID | OFF | 11059 |
| CAUSAL DOCUMENT ID | OFF | 21201 |
| ESTIMATE DATE | OFF | 2003/05/25 |
| ESTIMATE SCALE | ON | 1 - 2 MILLION YEN |
| ESTIMATOR | OFF | TARO SUZUKI |
| ESITIMATE | OFF | [ATTACHED FILE] |

FIG.11

FORM D: CONTRACT

| DATA ITEM | KEY | VALUE |
|---|---|---|
| DOCUMENT ID | OFF | 43229 |
| FORM TYPE | OFF | D |
| CAUSAL DOCUMENT ID | OFF | 11059 |
| CAUSAL DOCUMENT ID | OFF | 21201 |
| CAUSAL DOCUMENT ID | OFF | 33201 |
| CONTRACT DATE | OFF | 2003/05/31 |
| PERSON IN CHARGE | OFF | TARO SUZUKI |
| CONTRACT | OFF | [ATTACHED FILE] |

FIG.12

FORM E: INVOICE

| DATA ITEM | KEY | VALUE |
|---|---|---|
| DOCUMENT ID | OFF | 50348 |
| FORM TYPE | OFF | E |
| CAUSAL DOCUMENT ID | OFF | 11059 |
| CAUSAL DOCUMENT ID | OFF | 21201 |
| CAUSAL DOCUMENT ID | OFF | 33201 |
| CAUSAL DOCUMENT ID | OFF | 43229 |
| INVOICE DATE | OFF | 2003/06/02 |
| PERSON IN CHARGE | OFF | TARO SUZUKI |
| INVOICE | OFF | [ATTACHED FILE] |

FIG.13

FORM A: CUSTOMER INFORMATION

| DATA ITEM | KEY | VALUE |
|---|---|---|
| DOCUMENT ID | OFF | 11253 |
| FORM TYPE | OFF | A |
| CUSTOMER NAME | OFF | YYY, INC. |
| INVESTIGATOR | OFF | ICHIRO YAMADA |
| INVESTIGATE DATE | OFF | 2003/09/11 |
| SCALE | ON | 1 – 5 EMPLOYEES |
| TYPE OF INDUSTRY | ON | HOME/EQUIPMENT INSTALLATION |
| AREA | ON | ZZ CITY, KANAGAWA PREF. |
| COPY | ON | PRESENT |
| FAX | ON | PRESENT |
| PRINTER | ON | PRESENT |
| PC | ON | NOT PRESENT |
| LAN | ON | NOT PRESENT |
| OTHERS | OFF | |

FIG.14

FORM B: PROPOSAL

| DATA ITEM | KEY | VALUE |
|---|---|---|
| DOCUMENT ID | OFF | 21277 |
| FORM TYPE | OFF | B |
| CAUSAL DOCUMENT ID | OFF | 11253 |
| PROPOSER | OFF | ICHIRO YAMADA |
| PROPOSE DATE | OFF | 2003/09/19 |
| PROPOSAL SCALE | ON | 1 - 2 MILLION YEN |
| COPY | ON | 0 |
| FAX | ON | 0 |
| PRINTER | ON | 1 |
| PC | ON | 3 |
| COMPETITION | ON | COMPANIES A AND C |
| PROPOSAL | OFF | [ATTACHED FILE] |

FIG.15

FORM C: ESTIMATE

| DATA ITEM | KEY | VALUE |
|---|---|---|
| DOCUMENT ID | OFF | 33405 |
| FORM TYPE | OFF | C |
| CAUSAL DOCUMENT ID | OFF | 11253 |
| CAUSAL DOCUMENT ID | OFF | 21277 |
| ESTIMATE DATE | OFF | 2003/09/22 |
| ESTIMATE SCALE | ON | 1 - 2 MILLION YEN |
| ESTIMATOR | OFF | ICHIRO YAMADA |
| ESITIMATE | OFF | [ATTACHED FILE] |

FIG.16

FORM A: CUSTOMER INFORMATION

| DATA ITEM | KEY | VALUE |
|---|---|---|
| DOCUMENT ID | OFF | 10113 |
| FORM TYPE | OFF | A |
| CUSTOMER NAME | OFF | ZZZ, INC. |
| INVESTIGATOR | OFF | KOSUKE YAMAZAKI |
| INVESTIGATE DATE | OFF | 2003/06/01 |
| SCALE | ON | 1 – 5 EMPLOYEES |
| TYPE OF INDUSTRY | ON | HOME/EQUIPMENT INSTALLATION |
| AREA | ON | XYZ CITY, TOKYO |
| COPY | ON | PRESENT |
| FAX | ON | PRESENT |
| PRINTER | ON | PRESENT |
| PC | ON | PRESENT |
| LAN | ON | PRESENT |
| OTHERS | OFF | |

FIG.17

FORM A: CUSTOMER INFORMATION

| DATA ITEM | KEY | VALUE |
|---|---|---|
| DOCUMENT ID | OFF | 11051 |
| FORM TYPE | OFF | A |
| CUSTOMER NAME | OFF | XYZ, INC. |
| INVESTIGATOR | OFF | SHINICHIRO TAGAWA |
| INVESTIGATE DATE | OFF | 2003/07/12 |
| SCALE | ON | 1 – 5 EMPLOYEES |
| TYPE OF INDUSTRY | ON | HOME/EQUIPMENT INSTALLATION |
| AREA | ON | YZZ CITY, SAITAMA PREF. |
| COPY | ON | PRESENT |
| FAX | ON | PRESENT |
| PRINTER | ON | PRESENT |
| PC | ON | PRESENT |
| LAN | ON | NOT PRESENT |
| OTHERS | OFF | |

FIG.18

FORM A: CUSTOMER INFORMATION

| DATA ITEM | KEY | VALUE |
|---|---|---|
| DOCUMENT ID | OFF | 16838 |
| FORM TYPE | OFF | A |
| CUSTOMER NAME | OFF | ZYX, INC. |
| INVESTIGATOR | OFF | GORO NUMATA |
| INVESTIGATE DATE | OFF | 2003/11/15 |
| SCALE | ON | 1 – 5 EMPLOYEES |
| TYPE OF INDUSTRY | ON | HOME/EQUIPMENT INSTALLATION |
| AREA | ON | ABC CITY, CHIBA PREF. |
| COPY | ON | PRESENT |
| FAX | ON | PRESENT |
| PRINTER | ON | PRESENT |
| PC | ON | NOT PRESENT |
| LAN | ON | NOT PRESENT |
| OTHERS | OFF | |

FIG.20

| CLASSIFICATION NUMBER | FORM LIST | SEQUENCE OF DOCUMENT ORIGINATION |
|---|---|---|
| 0 | A→B→C→D→E | 11059→21201→33201→43229→50348 |
| 1 | A→B→C | 11253→21277→33405 |
| 2 | A | 10113<br>11051<br>16838 |

| FORM GROUP | NEXT NODE | STATE-TRANSITION KEY |
|---|---|---|
| 0 | →<FORM D> | 11059→21201→33201 |
| 1 | →<0> | 11253→21277→33405 |

NOTE: <0> INDICATES ENDING NODE

FIG.27

| KEY EVENT CANDIDATE | VALUE OF FORM 0 | VALUE OF FORM 1 | IS THIS KEY EVENT? |
|---|---|---|---|
| A: SCALE | 1-5 EMPLOYEES | 1-5 EMPLOYYES | NO |
| A: TYPE OF INDUSTRY | HOME/EQUIPMENT INSTALLATION | HOME/EQUIPMENT INSTALLATION | NO |
| A: AREA | CHIBA | KANAGAWA | YES |
| A: COPY | PRESENT | PRESENT | NO |
| A: FAX | PRESENT | PRESENT | NO |
| A: PRINTER | PRESENT | PRESENT | NO |
| A: PC | PRESENT | NOT PRESENT | YES |
| A: LAN | PRESENT | NOT PRESENT | YES |
| B: PROPOSAL SCLAE | 1-2 MILLION YEN | 1-2 MILLION YEN | NO |
| B: COPY | 0 | 0 | NO |
| B: FAX | 0 | 0 | NO |
| B: PRINTER | 1 | 1 | NO |
| B: PC | 2 | 3 | YES |
| B: COMPETITION | COMPANY C | COMPANIES A & C | YES |
| C: ESTIMATE SCALE | 1-2 MILLION YEN | 1-2 MILLION YEN | NO |

DOCUMENT GROUP ANALYZING APPARATUS, A DOCUMENT GROUP ANALYZING METHOD, A DOCUMENT GROUP ANALYZING SYSTEM, A PROGRAM, AND A RECORDING MEDIUM

BACKGROUND OF THE INVENTION

1. Field of the Invention

The present invention generally relates to a document group analyzing apparatus, a document group analyzing method, a document group analyzing system, a program, and a recording medium; and especially relates to the technology to search for document groups with causal relation, and to perform text-mining based on a search result.

2. Description of the Related Art

In order to make a business successful, it is often important to analyze the past. Typically, it is useful to plan a business meeting with reference to similar cases in the past.

There is technology to search for desired contents by inputting a search condition, wherein a document that meets the search condition is retrieved and presented (i.e., displayed and printed).

It sometimes happens that although cases appear similar to each other, the cases are divided into successful ones and failed ones, and that success is made although approaches are different. The past history cannot be fully utilized unless it is known "why some went good" and "why the others went wrong".

In order to fully utilize past experiences, document groups have to be classified into "success" ones and "failure" ones. According to conventional technology, correctly distinguishing between the two in a short time is difficult.

Even if the document groups can be divided into "success" and "failure", analyzing why a certain business went good, or wrong, is essential. At present, there is no specific technology for analyzing this way, and such an analysis is manually carried out.

SUMMARY OF THE INVENTION

The present invention is made in view of the present situations as described above, and aims at offering a document group analyzing apparatus, a document group analyzing method, a document group analyzing system, a program, and a recording medium that substantially obviate one or more of the problems caused by the limitations and disadvantages of the related art.

Specifically, the present invention aims at offering a document group analyzing apparatus, a document group analyzing method, a document group analyzing system, a program, and a recording medium that classify a document group with causal relation into success cases and failure cases, and provide information for analyzing the factors of success and failure.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a document group analyzing apparatus, a document group analyzing method, a document group analyzing system, a program, and a recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

Means for Solving the Problem

The present invention provides a document group analyzing apparatus that includes
a searching unit that searches a document database for a document according to a searching condition, and
a related document group extracting unit that extracts the document that meets the searching condition, and all documents that have causal relation to the document searched for from the document database.

The document group analyzing apparatus further includes
a document group classifying unit that bundles documents that have causal relation into a group, and classifies the documents by the kind of the document belonging to the group.

The document group analyzing apparatus further includes a state-transition graph generating unit that generates a state-transition graph, wherein the kind of a document serves as a node, and a document generated in a Form of the kind serves as a state-transition key. There, nodes are connected in the sequence of causal relation.

The document group analyzing apparatus further includes a key event extracting unit that extracts key events.

The present invention further provides a method of analyzing factors that lead to a success and a failure, wherein (first) documents are searched for and retrieved from a document database according to a search condition, (second) documents having causal relation to the (first) documents are retrieved, the first and the second documents are divided into groups where each group contains documents having causal relation, i.e., representing different stages of the same business, the documents of the groups are classified by kinds of the document, and a result of the classification, and contents of corresponding documents are displayed such that the factors for success and failure can be analyzed.

The present invention further provides a document group analyzing system that includes a document data server, a client, and a document group analyzing server.

The present invention further provides a computer executable program for a computer to perform the functions of the document group analyzing apparatus, or alternatively, the functions of the document group analyzing system.

The present invention further provides a computer readable recording medium that stores the program.

Effect of the Invention

According to the present invention, the following effects are obtained.

(1) Not only a document that meets a searching condition, but also other documents having causal relation are retrieved, and a history of a business flow is reconstructed, facilitating analysis of information in a convenient form.

(2) Generally, in a business wherein a form document (Form) is drawn up, a complete set of form documents (Forms) are usually generated if a business negotiation successfully goes through to a contract. Conversely, if a business is not a success, not all Forms are generated.

In the case of a goods selling business, the business flow is as follows, for example.

"Customer information registration document->Proposal->Estimate->Contract->Invoice". If the business is a failure, not all the documents are generated, and the document history looks like "Customer information registration document->Proposal", and "Customer information registration document->Proposal->Estimate".

Accordingly, by grouping document groups that are searched for according to kinds of Form, object business can be accurately classified.

(3) According to the present invention, a state-transition graph is generated, wherein success or failure is graphically displayed, providing information easy to analyze for a branching point between success and failure.

As auxiliary information for analyzing, key events are provided to facilitate analysis.

For example, if a data item "Competition" often shows "Company A" when businesses fail, it can be determined that a possibility of failing is high if Company A company is competing in a prospective business.

Further, time and effort of analysis can be lessened, and presentation of useless information can be eliminated, if an item that does not have generalities is specified as a factor that divides success and failure.

(4) When a Form document group with causal relation is placed in the document group concerning the business, in many cases, the Form documents are already managed in a clear form, and success and failure of a business can be clearly separated. Accordingly, new introduction of a workflow database is not required, and additional information of "Success" and "Failure" does not have to be attached to the business Forms. For this reason, the document group analyzing apparatus, or the document group analyzing system of the present invention can be introduced for a minimum cost.

BRIEF DESCRIPTION OF THE DRAWINGS

FIG. 3 is a table showing an example of data items of a Form A that is a Customer information registration document;

FIG. 4 is a table showing an example of data items of a Form B that is a Proposal;

FIG. 5 is a table showing an example of data items of a Form C that is an Estimate;

FIG. 6 is a table showing an example of data items of a Form D that is a Contract;

FIG. 7 is a table showing an example of data items of a Form E that is an Invoice;

FIG. 8 is a table showing an example of a Customer information registration document filled in with data;

FIG. 9 is a table showing an example of a Proposal filled in with data;

FIG. 10 is a table showing an example of an Estimate filled in with data;

FIG. 11 is a table showing an example of a Contract filled in with data;

FIG. 12 is a table showing an example of an Invoice filled in with data;

FIG. 13 is a table showing another example of a Customer information registration document filled in with data;

FIG. 14 is a table showing another example of a Proposal filled in with data;

FIG. 15 is a table showing another example of an Estimate filled in with data;

FIG. 16 is a table showing another example of a Customer information registration document filled in with data;

FIG. 17 is a table showing another example of a Customer information registration document filled in with data;

FIG. 18 is a table showing another example of a Customer information registration document filled in with data;

FIG. 20 is a table showing an example of a result of classifying documents by Form groups {grouping documents by causal relation, and classifying the document groups by Form lists};

FIG. 27 is a table for explaining an extraction method to extract key events;

DESCRIPTION OF THE PREFERRED EMBODIMENTS

In the following, embodiments of the document group analyzing system according to the present invention are described with reference to the accompanying drawings. Here, "a document group with causal relation" means "a group of documents that are generated (drawn up, drafted, issued, recorded) one after another as a certain business negotiation progresses, and accordingly have causal relation". For example, if Document B is drawn up only after Document A is drawn up, there is causal relation between Document A and Document B.

Further, for example, documents applicable to selling goods usually include "Customer information registration document", "Proposal", "Estimate", "Contract", and "Invoice", which are drawn up using Forms A, B, C, D, and E, respectively. Here, generally, unless "Estimate" is prepared, no contract is made, and no "Contract" document is prepared; accordingly, "Estimate" and "Contract" are documents having causal relation.

Although Embodiment 1 is described about a business wherein goods are sold to a customer, the present invention can be applied to other businesses if causal documents are drawn up.

Embodiment 1

Figures 1, 2:
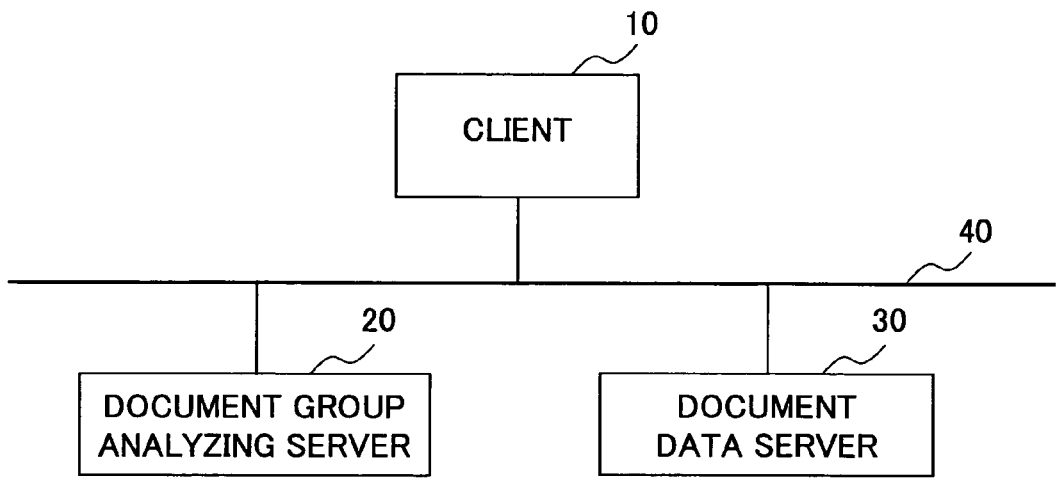
FIG. 1 is a block diagram showing the structure of a document group analyzing system according to embodiments of the present invention (Embodiment 1 and Embodiment 2)
FIG. 2 is a table showing an example of a basic data structure of a document stored in a document database.

FIG. 1 is a block diagram showing the structure of the document group analyzing system according to Embodiment 1 of the present invention. The document group analyzing system includes a client 10, a document group analyzing server 20, a document data server 30, and a network 40. Although one client 10 is shown in FIG. 1, the document group analyzing system may include two or more clients 10.

Generally, the client 10 is served by a personal computer, and is capable of accessing the document data server 30 through the network 40, capable of storing and viewing a document, capable of accessing the document group analyzing server 20 through the network 40, and capable of searching for a document and displaying the retrieved document. It is desirable that the client 10 be also capable of accessing a Web page.

As long as the above conditions are met, the client 10 does not have to be a personal computer, but PDA (Personal Digital Assistant) and a portable telephone may serve the purpose.

The document group analyzing server 20 is a computer that receives a document search request from the client 10, requests the document data server 30 that stores and manages a document group to search for the requested document, analyzes a search result, and provides the analyzed result to the client 10.

Further, the document group analyzing server 20 and the document data server 30 may be served by the same computer having file management and document group analyzing capabilities.

The document data server 30 is a computer that stores and manages a document group as a database, and updates the database in response to directions of the client 10 concerning registration, deletion, updating, etc., of documents. Further, the document data server 30 receives a searching condition from the document group analyzing server 20, searches for a requested document, and provides a search result to the document group analyzing server 20. Further, the document data server 30 may receive a transmitting request of a specific document from the document group analyzing server 20, and provide the requested document.

Here, a document stored in the database managed by the document data server 30 is attached with Data items that include a Data item indicating causal relation as follows, for example (refer to FIG. 2).

Document ID, which is a document identifier for identifying the present document.

Form type, which is an identifier of a type of Form in which the present document is drawn up.

Causal document ID, which is an identifier of a document that causes the present document to be generated, i.e., has causal relation to the present document; and where more than one Causal document IDs are given, such IDs are listed in the sequence of preparation, i.e., by dates. Accordingly, if the present document is drawn up first (e.g. Customer information registration), the Data item of Causal document IDs is not provided.

Form elements include bibliography matters such as an author name, a drafting date, a customer name, contents of the document, etc. Here, instead of the contents of the documents, a file identifier or a URI (Uniform Resource Identifier) of a file that holds the contents may be provided.

Each of the data items is constituted by 3 entries, i.e., Data item, Key, and Value. Value shows a data value corresponding to Data item. Key shows "ON" if Data item is a target of analysis, and "OFF" if Data item is not a target of analysis.

Forms having the data structure as above are defined as follows, for example.

(1) Form A: "Customer Information Registration Document"

This consists of 14 rows, each having 3 entries for Data item, Key and Value, as shown in FIG. 3. Namely, the rows include (Document ID, OFF, undefined), (Form type, OFF, "A" that is the value of Form A), (Customer name, OFF, undefined), (Investigator, OFF, undefined), (Investigation date OFF, undefined), (Scale, ON, undefined), (Type of industry, ON, undefined), (Area, ON, undefined), (Copier, ON, undefined), (FAX, ON, undefined), (Printer, ON, undefined), (PC, ON, undefined), (LAN, ON, undefined), and (Others, OFF, undefined). Since Form A is to register customer information, which is the first document to be drawn up in the business flow, a data item of Causal document ID is not present.

(2) Form B: "Proposal"

This consists of 12 rows as shown in FIG. 4. Namely, the rows include (Document ID, OFF, undefined), (Form type, OFF, "B"), (Causal document ID, OFF, undefined (when a value is set up, Document ID of Form A is inserted)), (Proposer, OFF, undefined), (Proposal date, OFF, undefined), (Proposal scale, ON, undefined), (Copier, ON, undefined), (FAX, ON undefined), (Printer, ON, undefined), (PC, ON, undefined), (Competition, ON, undefined), and (Proposal, OFF, undefined (when a value is set up, URI of the proposal is inserted).

(3) Form C: "Estimate"

This consists of eight rows as shown in FIG. 5. Namely, the rows include (Document ID, OFF, undefined), (Form type, OFF, "C"), (Causal document ID, OFF, undefined (when a value is set up, "Document ID" of Form A is inserted)), (Causal document ID, OFF, undefined (when a value is set up, Document ID of Form B is inserted)), (Estimate date, OFF, undefined), (Estimate scale, ON, undefined), (Estimating person, OFF, undefined), and (Estimate, OFF, undefined (when a value is set up, URI of the estimate is inserted)).

(4) Form D: "Contract"

This consists of eight rows as shown in FIG. 6. Namely, the rows include (Document ID, OFF, undefined), (Form type, OFF, "D"), (Causal document ID, OFF, undefined (when a value is set up, Document ID of Form A is inserted), (Causal document ID, OFF, undefined (when a value is set up, Document ID of Form B is inserted), (Causal document ID, OFF, undefined (when a value is set up, Document ID of Form C is inserted), (Contract date, OFF, undefined), (Sales person, OFF, undefined), and (Contract, OFF, undefined (when a value is set up, URI of the Contract document is inserted).

(5) Form E: "Invoice"

This consists of nine rows as shown in FIG. 7. Namely, the rows include (Document ID, OFF, undefined), (Form type, OFF, "E"), (Causal document ID, OFF, undefined (when a value is set up, Document ID of Form A is inserted), (Causal document ID, OFF, undefined (when a value is set up, Document ID of Form B is inserted), (Causal document ID, OFF, undefined (when a value is set up, Document ID of Form C is inserted), (Causal document ID, OFF, undefined (when a value is set up, Document ID of Form D is inserted), (Delivery date, OFF, undefined), (Person in charge, OFF, undefined), and (Invoice, OFF, undefined (when a value is set up, URI of the invoice is inserted).

In the description that follows, it is presupposed that a document group (documents shown in FIGS. 8 through 18 having causal relation prepared using Forms A through E) is stored in the database of the document data server 30.

For example, customer information collected at the time of visiting a customer is recorded using Form A as Customer information registration document as shown, e.g., in FIG. 8 and FIG. 13. Since these documents are drawn up first, Data item of Causal document ID is not provided.

Further, a proposal presented following the customer visit is recorded using Form B as shown in FIG. 9 and FIG. 14. Since these documents are drawn up following Customer information registration document, Data item of Causal document ID shows the document ID of the Customer information registration document.

The network 40 is a transmission path connecting the client 10, the document group analyzing server 20, and the document data server 30. The network 40 is often structured with a cable, TCP/IP serving as a communications protocol. Nevertheless, the transmission path may be based on wireless communication as long as communications protocols match, for example, LAN (Local Area Network), WAN (Wide Area Network), Internet, etc., can be used.

An outline of operations of the document group analyzing system structured as described above follows. A salesperson, e.g., draws up a business report in an appropriate form selected from Forms A through E according to the stage of the business using the client 10, and stores the document in the database of the document data server 30. In this manner, documents that have causal relation are accumulated in the database of the document data server 30.

Further, in order to locate a document group that can be helpful to the salesperson for advancing the business, the salesperson transmits a searching condition typically including a customer name, a brand name, a goods size, etc., to the document group analyzing server 20 from the client 10.

The document group analyzing server 20 receives the searching condition, and provides the searching condition to the document data server 30, requesting a search. When a search result is provided by the document data server 30, the document group analyzing server 20 analyzes the received search result, and returns an analyzing result to the client 10 that originates the request. The salesperson acquires the desired document group based on the analyzing result that the client 10 receives and displays.

Figure 19:
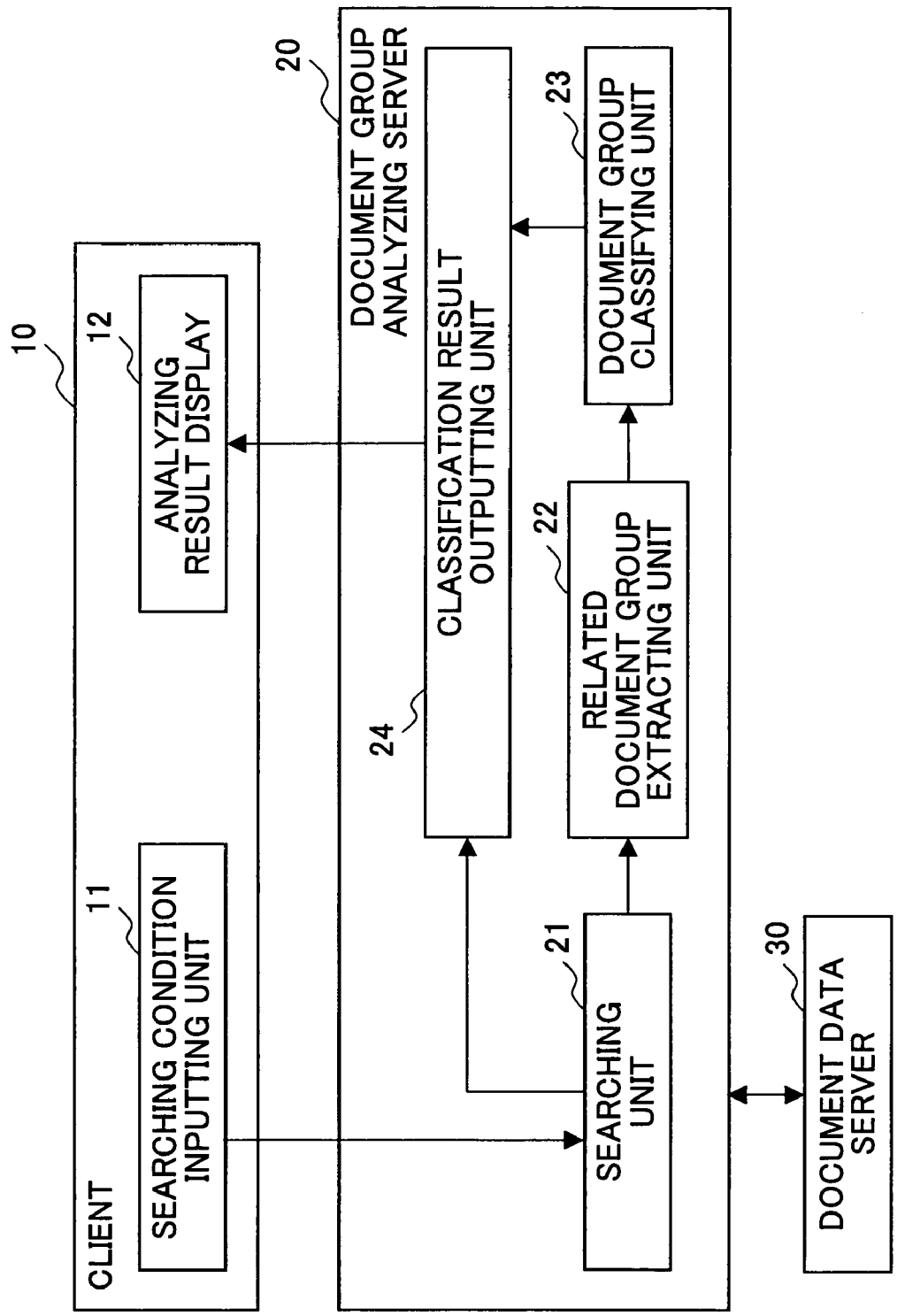
FIG. 19 is a block diagram showing a functional structure of a client and a document group analyzing server of the document group analyzing system according to Embodiment 1 of the present invention.

Next, the structure of the document group analyzing system is explained with reference to FIG. 19, which is a block diagram showing functions of the client 10 and the document group analyzing server 20 of the document group analyzing system.

The client 10 includes a searching condition inputting unit 11 and an analyzing result display 12.

Although the client 10 needs to be equipped with a document preparing unit configured to perform storing, editing, and viewing documents with causal relation, the present invention presupposes that a document group with causal relation is already available in the database; and for this reason, description about the document preparing unit is omitted.

The searching condition inputting unit 11 receives an input of a searching condition from the salesperson, and transmits the searching condition to the document group analyzing server 20. The searching condition specifies a condition, under which Data items of Forms shown in FIGS. 2 through 7 are to be searched for. For example, if Data items "Type of industry" and "Scale" are searched for, the searching condition such as "Type of industry=residence and equipment construction", and "Scale=1-5 employees" are input, and transmitted.

The analyzing result display 12 displays an analyzing result transmitted from the document group analyzing server 20. The analyzing result and a method of display are described below.

The transmitted analyzing result may be stored in a storage unit, such as a hard disk, and output to a printer.

The document group analyzing server 20 includes a searching unit 21, a related document group extracting unit 22, a document group classifying unit 23, and a classification result outputting unit 24.

The searching unit 21 receives the searching condition from the client 10, transfers the searching condition to the document data server 30, and requests searching implementation.

The document data server 30 searches the database that stores the document group for documents that meet the received searching condition, copies (takes out) the contents of the documents meeting the searching condition, and responds to the searching unit 21 of the document group analyzing server 20 that originates the request.

The searching unit 21 provides a document group that consists of the contents of the documents of a search result to the related document group extracting unit 22.

For example, if the searching condition is "Type of industry=home and equipment installation", the following five documents are identified as meeting the search condition, namely, Document-ID=11059 (Customer information registration document of FIG. 8), Document-ID=11253 (Customer information registration document of FIG. 13), Document-ID=10113 (Customer information registration document of FIG. 16), Document-ID=11051 (Customer information registration document of FIG. 17), and Document-ID=16838 (Customer information registration document of FIG. 18).

The related document group extracting unit 22 extracts related documents having causal relation with the searched for documents from the document data server 30, and compiles a document group consisting of the searched for documents and the related documents. This process is performed as follows.

(1) Take out the values of Document ID and Causal document ID from the searched for documents. In the case of the example above, the document IDs of the searched for documents are 11059, 11253, 10113, 11051, and 16838. Since these documents are Customer information registration documents generated at the first stage of business, there is no Causal document.

(2) The taken-out document IDs are "made unique" i.e., if duplication is present, the duplication is rectified.

(3) Request the document data server 30 to provide a group of documents (a document group) that have any one of the unique document IDs either as Document ID or as Causal document ID.

According to the above example, document groups containing documents (11059, 21201, 33201, 43229, 50348), (11253, 21277, 33405), (10113), (11051), and (16838) are obtained.

(4) As for each document group, if a document group includes a document that has been already obtained, the document that has already been obtained is deleted; and if there is no remaining document in the document group, acquisition of the document group having causal relation is ended.

In the above example, the documents (11059, 11253, 10113, 11051, 16838), which are included in the documents obtained at (3) above, have already been received at (1) above, and therefore, are deleted from the document groups that are obtained at (3) above.

(5) The documents remaining at (4) and the searched for documents are packed into a document group, and the process from (1) is repeated.

In the above example, the group of the remaining documents (21201, 33201, 43229, 50348, 21277, 33405) is added to the group of searched for documents (11059, 11253, 10113, 11051, 16838), and a related document group having causal relation is complied containing documents (11059, 21201, 33201, 43229, 50348, 11253, 21277, 33405, 10113, 11051, 16838). The process from (1) is repeated until no additional document with causal relation to this document group is found.

The related document group extracting unit 22 provides the related document group having causal relation as described above to the document group classifying unit 23.

The document group classifying unit 23 receives the related document group from the related document group extracting unit 22, the following processes are performed, and documents contained in the related document group are classified by Forms.

The related document group is first classified into a group of documents that share the same causal relation. That is, documents drawn up according to progress of business, starting from Customer information registration document, constitute a group.

(1) First, n is initialized, i.e., n=0.

(2) If there is no document to take out (copy) from the related document group, the process progresses to (8). If such document is present, the document ID of the document is taken out, and called Document d.

(3) A document group g(n) is declared, and the document Id of Document d taken out from the related document group is inserted in the document group g(n).

(4) Document c containing Causal document ID that matches the document ID is taken out from the related document group, and Document ID of Document c is added to the document group g(n).

(5) The above (4) is repeated until there are no more documents to be added to the document group g(n).

(6) Delete a document that is stored in the document group g(n) from the related document group.

(7) Return to (2) after incrementing n by 1, i.e., n=n+1.

(8) Rearrange documents in the order of drafting dates for each document group.

According to the above example, a document group g(0)= {11059, 21201, 33201, 43229, 50348}, a document group g(1)={11253, 21277, 33405}, a document group g(2)= 101131, a document group g(3)={11051}, and a document group g(4)={16838} are obtained.

Next, out of the obtained document groups g, document groups that have the same document generating process (a list of types of Forms of the drawn-up document being arranged in the order of drafting dates, which is called Form list in the following) constitute a Form group by the following process.

(9) First, m is initialized, i.e., m=0.

(10) If there is no document group to be taken out of the document groups g, generation of Form group is ended. If there is a document group to be taken out, the document group is taken out and defined as g(k).

(11) Form group G(m) is declared, and the document group g(k) is inserted in G(m).

(12) Extract Form list F(G(m)) of the document group g in the Form group G(m).

(13) Take out a document group g(j) that has the same Form list as F(G(m)) out of the document group g, and insert to Form group G(m).

(14) Return to (10) with m being incremented by 1, i.e., m=m+1.

In the case of the above-described example, three document groups g(2), g(3), and g(4) out of the five document groups have the same Form list. Accordingly, the three Form groups are generated, namely, G(0)={{11059, 21201, 33201, 43229, 50348}}, G(1)={{11253, 21277, 33405}, and G(2)= {{10113}, {11051}, {16838}}. Refer to FIG. 20.

Further, Form lists of each Form group are F(G(0))={A, B, C, D, E}, F(G(1))={A, B, C}, and F(G(2))={A}.

In the case of the above example, with reference to FIG. 20, Form list of the document group g(0), i.e., F(G(0)) is "A, B, C, D, E". Form list of the document group g(1), i.e., F(G(1)) is "A, B, C". Three document groups g(2), g(3), and g(4) have the same Form list "A", which is named F(G(2)). Accordingly, three Form groups are generated, namely, G(0)= {{11059, 21201, 33201, 43229, 50348}}, G(1)={{11253, 21277, 33405}, and G(2)={{10113}, {11051}, {16838}}.

The classification result outputting unit 24 receives the searching condition that the salesperson inputs from the searching unit 21, and the document group g, Form group G, and Form list F from the document group classifying unit 23.

The classification result outputting unit 24 provides the requesting client 10 with "Searching condition", "List of Document IDs that belong to a document group for each document group", "List of document groups that belong to a Form group for each Form group and Form list", and "Contents of documents having causal relation with the document that matches the searching condition".

Figure 21:
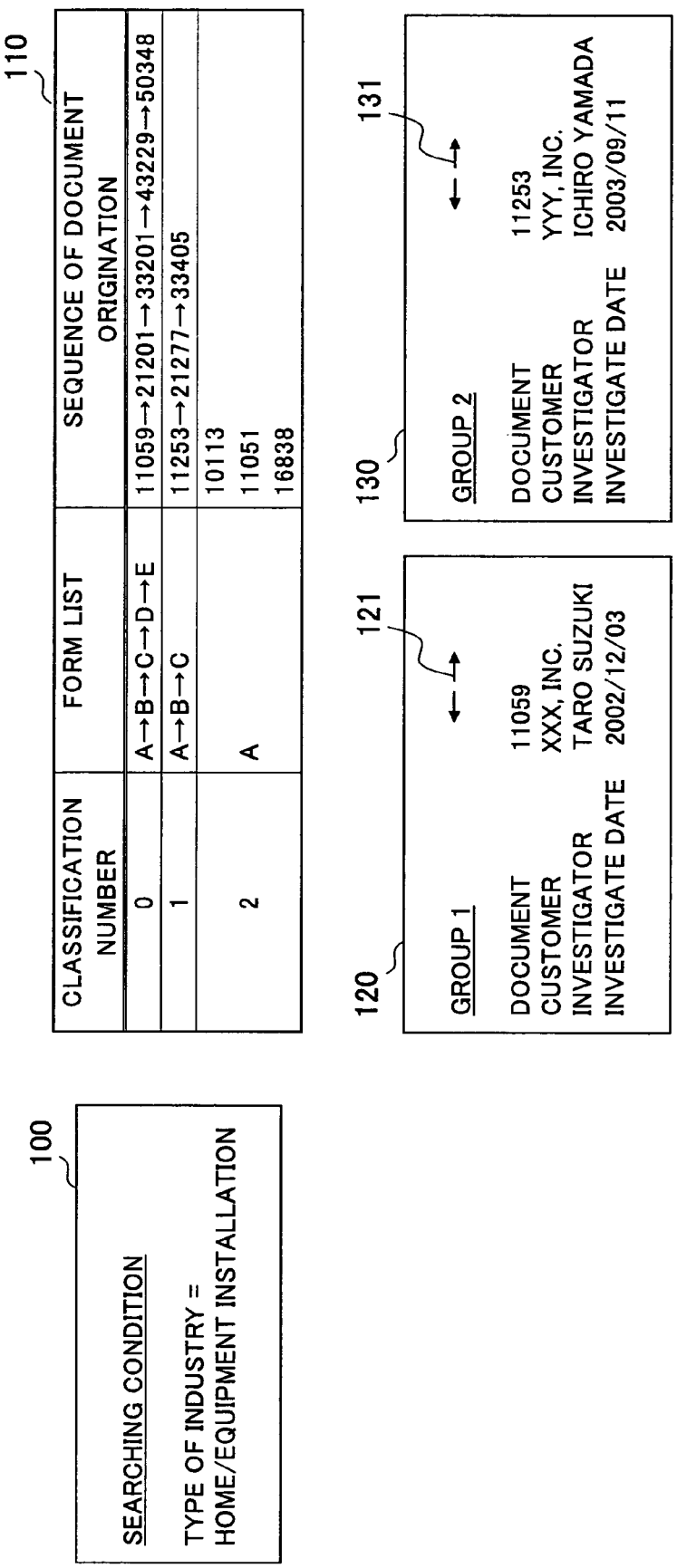
FIG. 21 is an example of a display screen of the client showing the classification result.

The analyzing result display 12 of a client 10 receives the data as described immediately above, reconfigures the data, and displays the data on the display. An example of the display presentation is shown in FIG. 21, wherein the screen is divided into 3 or 4 sections. A screen 100 displays the input searching condition. A screen 110 displays each group divided by Form groups. Screens 120 and 130 correspond to the Form groups G(0) and G(1), respectively, and display the contents (value corresponding to the data item) of all the documents corresponding to one of the Forms in the Form list.

Further, if a screen cannot display all the items to be displayed, each screen (100, 110, 120, and 130) is made to scroll vertically or horizontally, as desired such that all the items can be presented.

When the analyzing result display 12 is started, the display screen 100 of searching condition, and the display screen 110 of Form group are shown.

Next, the salesperson is to click the classification number "1" on the display with a mouse. Then, all document contents that belong to the first Form in Form list of the classification are displayed on the contents display screen 120.

Then, contents of a document can be displayed in the order of document generation in Form list by clicking either of a right or a left arrow 121 with the mouse on the contents display screen 120. For example, if the right arrow is clicked when the document of Document ID=21201 is displayed on the document display screen 120, the contents of the document of Document ID=33201 are displayed, and if a left arrow is clicked, the document of Document ID=11059 is displayed.

When the document displayed on the contents display screen 120 is about to disappear from the Form group displaying screen 110, the Form group display screen 110 scrolls such that a relative position on Form group list can be ascertained. That is, the Form group display screen 110 scrolls (or changes the page) in sync with the contents display screen 120.

Further, if the document ID on the Form group display screen 110 is clicked with the mouse, the contents of the selected document are displayed on the contents display screen 120.

Further, when two classification numbers are simultaneously chosen at the Form group display screen 110, the contents of the document belonging to each Form group are displayed by the contents display screens 120 and 130. In this case, the display screens 120 and 130 show corresponding documents of the same Form. In the example shown by FIG. 21, if the classification numbers 1 and 2 are simultaneously chosen, the document of Document ID=11059 is displayed on the display screen 120, and the document of Document ID=11253 is displayed on the display screen 130, both being in the same Form.

Further, if one of the arrows 121 and 131 at the upper right corner of the display screens 120 or 130, respectively, is clicked, documents corresponding to the next or previous Form, as applicable, are displayed, both screens in sync each other. In the case that there is no document corresponding to a chosen Form, a blank is displayed.

Since the contents of the documents made in the same Form can be reviewed comparing with each other by the contents display screens 120 and 130, finding a factor of a success or failure is facilitated.

Embodiment 2

In order to conduct an attribution analysis to determine what separates a success and failure from the analyzing result of Embodiment 1, the salesperson has to identify a branch point from which a different Form is used in Form list, to display and compare contents of documents generated at the branch point.

In this connection, Embodiment 2 is to display the analyzing result such that the comparison is facilitated.

The outline structure of Embodiment 2 is the same as that of Embodiment 1 (refer to FIG. 1), and descriptions thereof are not repeated.

Figure 22:
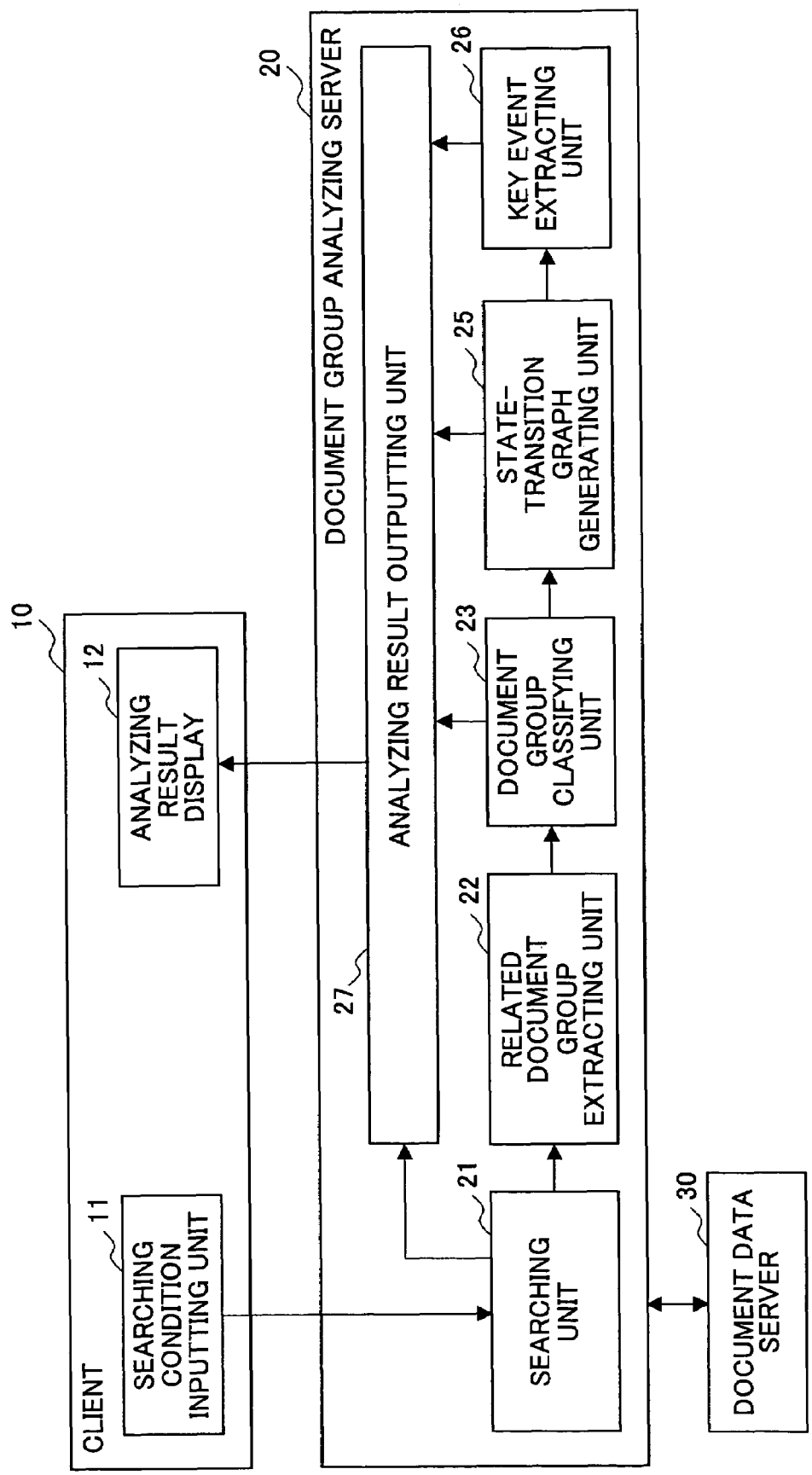
FIG. 22 a block diagram showing the functional structure of the client and the document group analyzing server of the document group analyzing system according to Embodiment 2 of the present invention.

FIG. 22 is a block diagram showing the functional structure of the document group analyzing system according to Embodiment 2 that includes the client 10 and the document group analyzing server 20.

Although the client 10 has the same functional structure as Embodiment 1, since the analyzing result is different, there is difference in the way that screens are displayed by the analyzing result display 12. The difference is described below where an output of the document group analyzing server 20 is described.

The document group analyzing server 20 includes the searching unit 21, the related document group extracting unit 22, the document group classifying unit 23, a state-transition graph generating unit 25, a key event extracting unit 26, and an analyzing result outputting unit 27. The same reference marks are attached to items providing the same function as Embodiment 1, and a description thereof is provided where a difference is present.

The searching unit 21 obtains a document group from the document data server 30, the document group matching the searching condition provided by the client 10, and provides the document group of the search result to the related document group extracting unit 22.

If the searching condition is "Type of industry=residence and equipment construction; and Scale=1-5 persons", two documents, namely, Document ID=11059 (FIG. 8) and Document ID=11253 (FIG. 13) are picked up as the search result.

The related document group extracting unit 22 receives the document group of the search result, and Causal documents having causal relation from the document data server 30, and compiles them into one document group as in Embodiment 1.

The document group classifying unit 23 classifies the document group with causal relation into a Form group that has the same Form list from the document group as in Embodiment 1, and provides the classification result to the state-transition graph generating unit 25.

Figure 23:
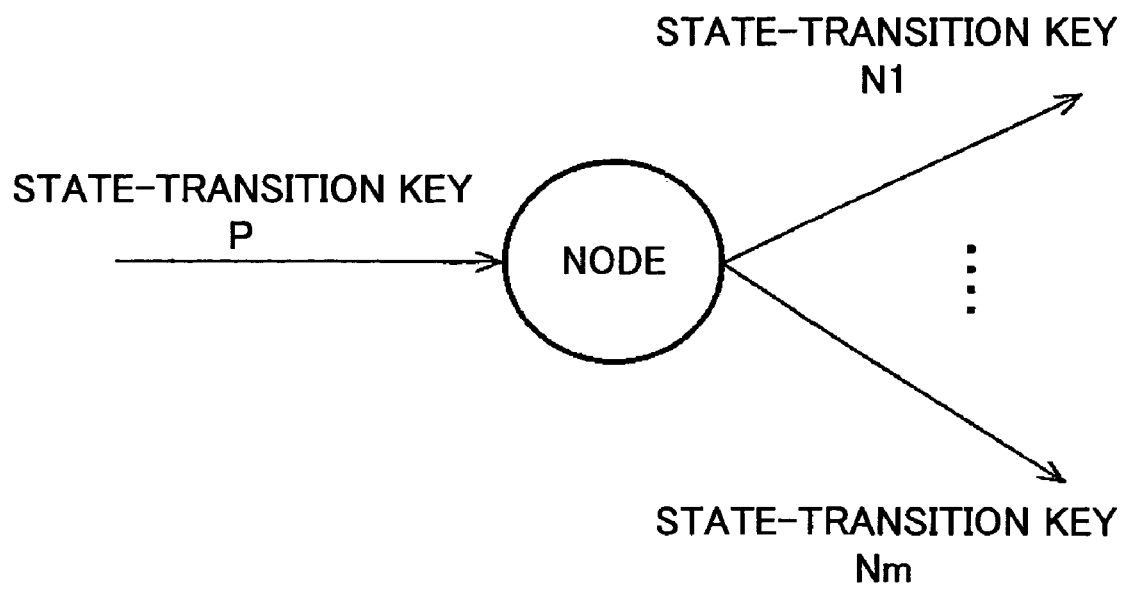
FIG. 23 is a chart showing a relation between a node and state-transition keys in a state-transition graph.

The state-transition graph generating unit 25 generates a state-transition graph expressing causal relation based on the document group provided by the document group classifying unit 23. In the state-transition graph, the type of the Form used when reporting a result of a certain business is treated as a node (state), and Document ID of the document drawn up serves as a state-transition key (refer to FIG. 23).

A state-transition graph is generated as follows.

(1) A counter n of a Form group is initialized, i.e., n=0.

(2) When the counter n exceeds the number of the groups of Form group, the process progresses to (8).

Figure 24A:
FIG. 24A is a chart showing a starting node and an ending node of a node graph generating process about a Form group.

(3) A starting node Ns and an ending node Ne are prepared, both being vacant (FIG. 24A).

Figure 24B:
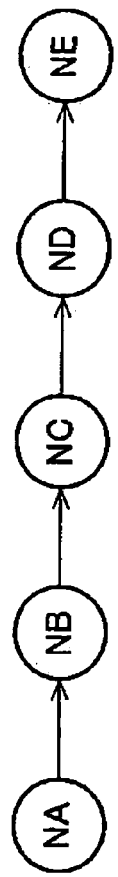
FIG. 24B is a chart showing the node graph generating process about the Form group, wherein nodes NA, NB, NC, ND, and NE corresponding to Form A, B, C, D, and E, respectively, are connected.

(4) Nodes NA, NB, NC, ND, and NE are generated in the order of elements in the Form list F(G(n)) that corresponds to the Form group G(n), and the Nodes NA, NB, NC, ND, and NE are connected in this sequence such that a node graph N(G(n)) is generated (FIG. 24B).

Figure 24C:
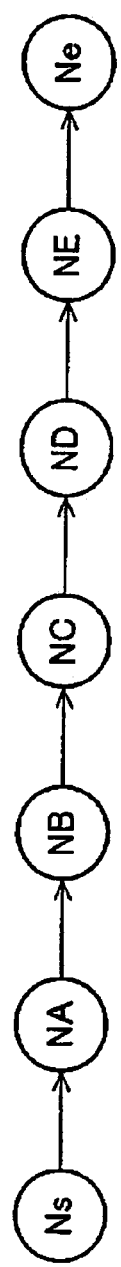
FIG. 24C is a chart showing the node graph generating process about the Form group, wherein the starting node and the ending node are added to the node graph of FIG. 24B.

(5) The starting node Ns is prefixed to the node graph N(G(n)), and the ending node Ne is suffixed to the node graph N(G(n) (FIG. 24C).

(6) For each document group g belonging to Form group G(n), Form of the document belonging to the document group g is extracted, and set as a state-transition key from the node of the node graph N(G(n)) corresponding to the Form. In this manner, the node graph N(G(n)) is completed (FIG. 24D).

(7) The counter n of Form group is incremented by 1, i.e., n=n+1, and the process returns to (2).

Figures 25, 26:
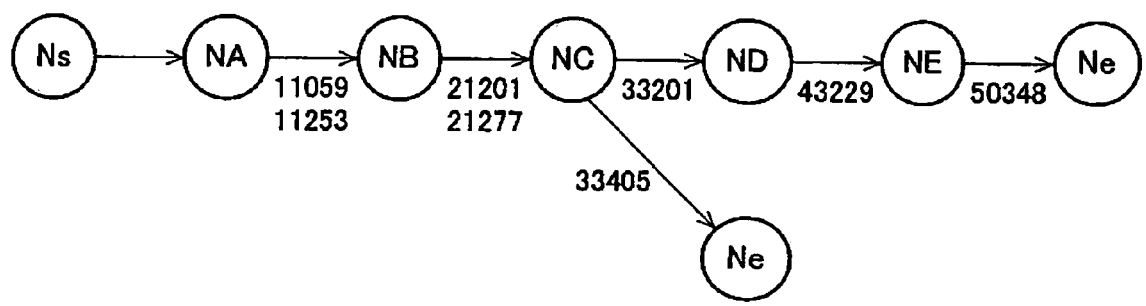
FIG. 25 is a chart showing an example of a state-transition graph.
FIG. 26 is a table showing a result of classifying state-transition keys by Form groups, the state-transition keys being before a branch node in the state-transition graph.

(8) Out of node graphs N for each Form group obtained by the process described above, node graphs that partially share the same Form list are unified, and the state-transition graph is generated (FIG. 25).

Figure 24D:
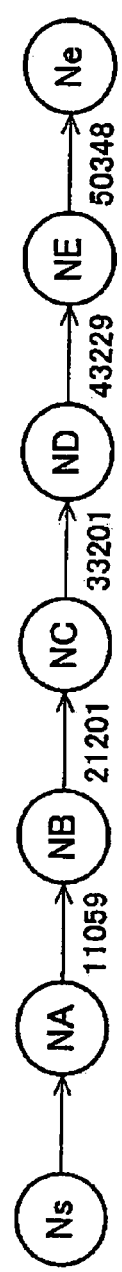
FIG. 24D is a chart showing the node graph generating process completing the Form group, where transition keys are inserted.
Figure 24E:
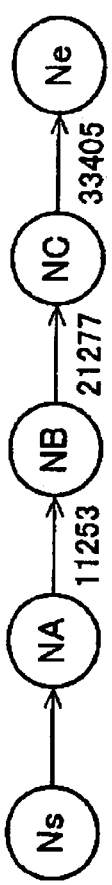
FIG. 24E is a chart showing a node graph of another Form group.

In the case of the example described above, a node graph N(G(0)) corresponding to Form group G(0) is as shown in FIG. 24D, and a node graph N(G(1)) corresponding to Form group G(1) is as shown in FIG. 24E. The two node graphs N are the same from the starting node Ns to Node NC.

Accordingly, the node graph N(G(1)) is unified with the node graph N(G(0)) to Node NC, and the state-transition key of the node graph N(G(0)) and the state-transition key of the node graph N(G(1)) are combined.

Further, a section between Node C and the ending node Ne of the node graph N(G(1)) is not in agreement with the node graph N(G(0)). Accordingly, the graph after the node NC of the node graph N(G(1)) is branched from the node NC of the node graph N(G(0)) as shown in FIG. 25.

In this manner, common portions of the node graphs are unified, and a state-transition graph S is generated. Accordingly, if there are Form lists without a common section, two or more state-transition graphs S are generated.

Further, when unifying node graphs having a common section, the Form group G is made to correspond to the state-transition graph S.

The state-transition graph generating unit 25 provides the state-transition graph generated as above and the classification result generated by the document group classifying unit 23 to the key event extracting unit 26.

About each of the provided state-transition graph, the key event extracting unit 26 searches for the node from which states are branched to two or more transition destinations, and extracts state-transition keys (document ID) of the branch and all the preceding state-transition keys. Further, when there are two or more nodes from which states are branched, state-transition keys of all the branching nodes are extracted.

In the case shown by FIG. 25, for example, states are branched from Node NC (Form C). Accordingly, state-transition keys (33201, 33405, 21201, 21277, 11059, 11253) are extracted.

The extracted state-transition keys are classified into every Form group G.

In the above example, the state-transition keys (11059, 21201, 33201) belong to Form group G(0), and the state-transition keys (11253, 21277, 33405) belong to Form group G(1), which is summarized in FIG. 26.

Next, about the documents indicated by all the state-transition keys (document ID) belonging to each Form group, if "key=ON", all of the data items and the value are extracted as a key event candidate.

FIG. 27 is a table summarizing the key event candidates in the case of the above example. In FIG. 27, values corresponding to key event candidates are divided for every Form group. When two or more document groups are in the Form group G here, the number of the Form groups is equal to the number of sequences (columns) for the document groups. In FIG. 27, the column headed by "Key event candidate" is expressed in the form of "Fixed-form: Data item name". For example "A: Scale" means the "Form A", and its element name is "Scale".

Next, whether a key event candidate is a key event is determined.

(1) It is determined whether there is any data item of documents belonging to the same Form group having a common value. This determination is performed to all the Form groups.

When there is only one document that belongs to a Form group, the value of the data item of such document is made a common value.

(2) If there is no Form group having a common value, it is determined that the data item is not a key event.

(3) On the other hand, in the case that there is a Form group that has a common value, if the value common within a Form group does not agree with a value of a data item of a document that belongs to another Form group, the key event candidate concerned is determined to be a key event, and the common value that is present only in the Form group is called a peculiar value of the data item.

(4) Conversely, if a data item of the document has the same value as another Form group, the data item concerned is determined not to be a key event.

In the above-mentioned example, since the number of documents belonging to each Form group is one, the values of all key event candidates' data items take respective common values. Accordingly, with reference to FIG. 27, when data items have the same values at VALUE OF FORM 0 and VALUE OF FORM 1, "NO" is given in the column of "IS THIS KEY EVENT?" If, otherwise, there are data items having different values at VALUE OF FORM 0 and VALUE OF FORM 1, "YES" is given. Namely, out of the key event candidates, "A: Area", "A: PC", "A: LAN", "B: PC", and "B: Competition" have differences between the two groups, and are determined to be the key events.

However, in the case that two or more documents are present in a Form group, if there is at least one value that is the same for at least two of the Form groups, the data item is made not to be a key event.

For example, suppose that the data item "Copy", being one of the key event candidates, has values for each Form group as follows.

Form group G(0): {"present"}.
Form group G(1): {"present", "not present"}.

In this case, since Form group G(0) and Form group G(1) have the same value "present", the data item "PC" is determined not to be a key event.

Conversely, when a common value of a data item of a key event candidate is not shared by other Form groups, the data item is determined to be a key event.

For example, suppose that values of the data item "Area" of a key event candidate of each Form group are as follows.

Form group G(0): {"Chiba"}.
Form group G(1): {"Kanagawa", "Saitama"}.

In this case, the common value of Form group G(0) is not shared by Form group G(1); accordingly, the data item "Area" is determined to be a key event.

Suppose that values of the data item "Competition", being another key event candidate, of each Form group are as follows.

Form group G(0): {"C"}.
Form group G(1): {"A, C", "A"}.

In this case, although the common value "C" of Form group G(0) is shared by Form group G(1), the common value "A" of Form group G(1) is not shared by Form group G(0). Accordingly, the data item "Competition" is determined to be a key event.

The analyzing result outputting unit 27 receives
the searching condition that the salesperson inputs from the searching unit 21,
the document group g, Form group G, and Form list F from the document group classifying unit 23,
the state-transition graph S and the list of Form groups used to generate the state-transition graph S from the state-transition graph generating unit 25, and
the key events from the key event extracting unit 26.

The analyzing result outputting unit 27 returns the following items to the requesting client 10, namely:
"searching condition",
"all key events",
"the list of Document IDs that belong to a document group for each document group",
"the list of document groups and Form list that belong to a Form group for each Form group",
"all state-transition graphs and the list of Form groups used to generate each state-transition graph" and
"contents of the documents that meet the searching condition and all the documents having causal relation".

Figure 28:
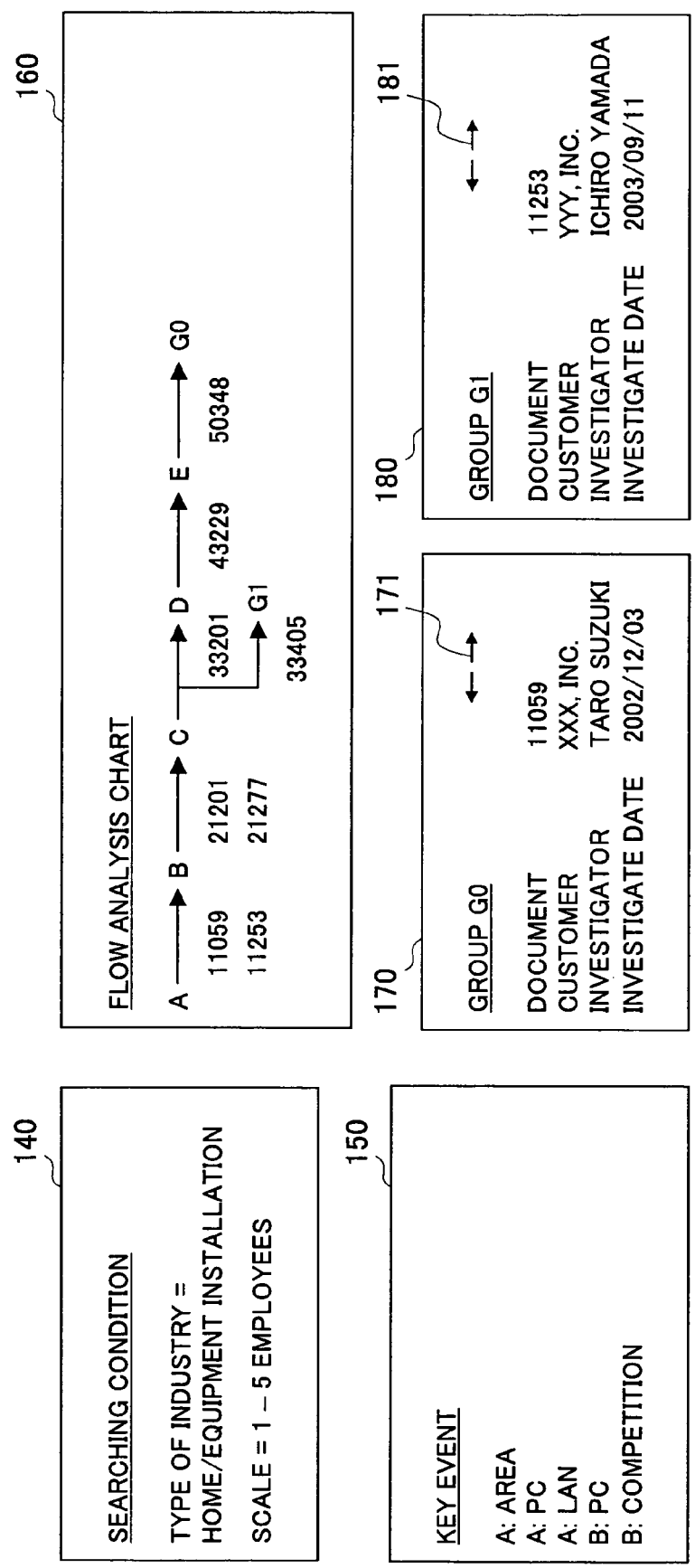
FIG. 28 shows an example of the display screen showing the key event extraction result at the client.

The analyzing result display 12 of the client 10 receives and reconfigures the data such that screens such as shown in FIG. 28 are prepared for display.

In FIG. 28, the display screen is divided into 4 or 5 sections. A screen 140 displays the searching conditions that are input.

A screen 150 displays the data item names of the key events. The data item names are prefixed with respective Form names in order to facilitate associating each data item with Forms.

Further, a screen 160 displays a flow analyzing view, wherein a name is given to each Form group (G0 and G1), and the ending nodes of the state-transition graph generated in the state-transition graph generating unit 25 are replaced with the respective Form group names.

Further, when the display screen cannot show all the items to be displayed, each screen (140, 150 and 160) can be vertically or horizontally scrolled.

Screens 170 and 180 correspond to each Form group, and display the contents of all the documents (values corresponding to the respective data items) corresponding to a Form in the Form list.

Further, although each screen (170 and 180) vertically scrolls if all items cannot be displayed, the screens 170 and 180 are not scrolled in sync with each other. Further, when there are two or more documents to one Form, the documents belonging to the same Form are displayed one after another by horizontally scrolling. When the next document is displayed, it is displayed such that the same data items that are displayed until now appear. By scrolling to the right, the following document is displayed, and by scrolling to the left, the previous document is displayed.

When the analyzing result display 12 is started, the display screen 140 of searching condition, the display screen 150 of a key event, and the flow analyzing view display screen 160 are displayed.

Next, if a salesperson clicks the Form group name of the flow analyzing view with a mouse, all the contents of documents that belong to the first Form in the Form lists of the Form group are displayed on the contents display screen 170.

Then, the contents of a document are displayed in the order of document generation of a Form list by clicking either of the right and left arrows 171 with the mouse on the contents display screen 170. At this time, such that the document displayed on the screen 170 is identified on the flow analyzing view display screen 160 to view a relative position of the document, the flow analyzing view display screen 160 also scrolls. That is, the flow analyzing view display screen 160 and the contents display screen 170 synchronously scroll (or change pages).

Further, if a Document ID on the flow analyzing view display screen 160 is clicked with the mouse, the contents of the selected document are displayed on the contents display screen 170.

Further, in the case that two Form group names are simultaneously chosen at the flow analyzing view display screen 160, the contents of the documents belonging to each Form group are displayed on the contents display screens 170 and 180. In this case, the documents displayed on the display screens 170 and 180 are of the same Form. Further, when one of arrows 171 and 181 is clicked, the display screens 170 or 180 scroll in sync with each other showing the documents corresponding to the following Form. At this instance, when there is no document belonging to the corresponding Form, a blank is displayed.

In this manner, the contents of the documents in the same Form can be compared on the contents display screens 170 and 180, with the data items of the key events being displayed, and finding a factor of success and failure is facilitated.

Figure 29:
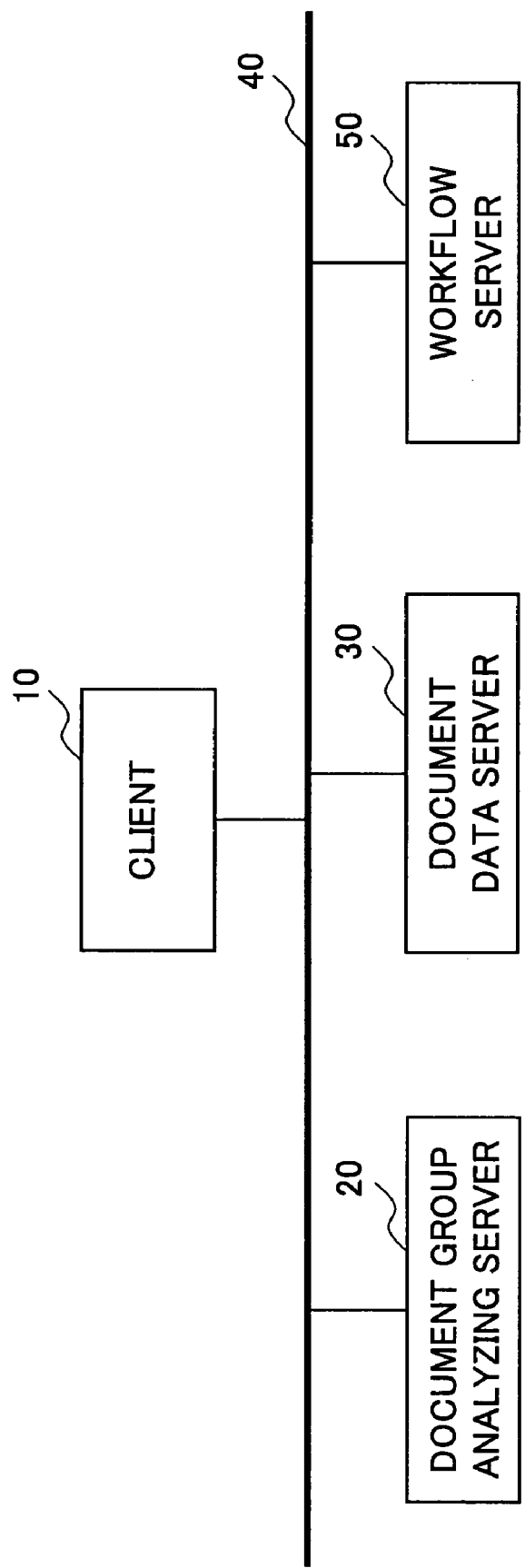
FIG. 29 is a block diagram showing the structure of the document group analyzing system using a workflow server.

Embodiments 1 and 2 above are described in the premise that the documents with causal relation are accumulated in the document data server. Alternatively, generation and management of documents having causal relation can be carried out using a workflow server 50 (FIG. 29).

The workflow server 50 holds Forms, wherein execution of business and Form are associated, generates a document in a required Form according to progress of business, and registers the document in the document data server 30. The salesperson completes the Form by filling in required items.

By repeating the process that draws up documents according to the workflow, a group of documents that have causal relation are accumulated in the document data server 30.

If the workflow server 50 is already in use, introduction of the document group analyzing system is facilitated.

Embodiment 3

The present invention is not limited to Embodiments as described above. The objective of the present invention can be attained by executing a program installed in a memory of a computer or in a storage apparatus, the program being stored in a recording medium such as a CD-ROM disk and read by a medium driving apparatus such as a CD-ROM drive mounted on the document group analyzing server and/or the client that constitutes the document group analyzing system. The program is prepared such that functions of each server and the client, constituting the document group analyzing system, are performed by executing the program.

In this case, the program read from the recording medium mentioned above realizes the function of Embodiments. Accordingly, the program, and the recording medium that stores the program also constitute the present invention.

In addition, the recording medium that stores the program includes semiconductor media (for example, ROM, non-volatile memory card), optical media (for example, DVD, MO, MD, CD), and magnetic media (for example, magnetic tapes, flexible disks).

Further, the present invention includes the case where the function of Embodiments described above is realized not only by the program, but also in collaboration with an operating system or other application programs based on directions of the program.

When circulating the program of the present invention in the market, the program may be stored to a portable recording medium for circulation; and the program may be stored in the storage of a server computer connected to networks such as the Internet, and distributed to other computers through the network. In this case, the storage of the server computer is also contained in the recording medium of the present invention.

In addition, a computer realizes the function of Embodiments described above by installing and executing the program that is stored in the portable recording medium, or transmitted through the network.

Further, the computer may be a stand-alone computer, and may be networked computers. In the latter case, the program to be executed by a computer may be stored in another computer, and distributed process or remote process may be arranged.

In this case, the Internet, LAN, WAN, etc., can be used for communications between the computers.

By programming the functions of Embodiments of the present invention as described above, and making them available to the market in this manner, cost is reduced, and portability and versatility can be raised.

Further, the present invention is not limited to these embodiments, but variations and modifications may be made without departing from the scope of the present invention.

The present application is based on Japanese Priority Application No. 2004-054838 filed on Feb. 27, 2004 with the Japanese Patent Office, the entire contents of which are hereby incorporated by reference.

What is claimed is:

1. A document group analyzing apparatus comprising:
   a processor comprising:
      a searching unit configured to locate a document specified by a searching condition in a document database that holds causally related documents;
      a related document group extracting unit configured to extract the document located by the searching unit, and all documents in the database that are casually related to the document located by the searching unit;

a document group classifying unit configured to collect the documents extracted by the related document extracting unit, organize the collected documents into a group, and classify each document in the group by kind of document;

a result outputting unit that provides a client with a result of the classification done by the document group classifying unit; and a state-transition graph generating unit configured to generate a state-transition graph, wherein nodes are connected in sequence by the causal relation, each node being associated with one of the kinds of the documents, and a state-transition key that goes from a certain node N1 to another node N2 is expressed by a document that belongs to the kind of the document associated with the node N1, a document group that belongs to each class generated by the document group classifying unit is made into an individual state-transition graph, and common portions in a transition pattern of individual state-transition graphs of the kinds of documents are unified.

2. The document group analyzing apparatus as claimed in claim 1, further comprising:

a key event extracting unit configured to extract a data item as a key event, wherein for each transition from a node branched into two or more subsequent nodes:

documents consisting of a state-transition key from the branching node and one or more state-transition keys before the branching node constitute a group, a group is constituted for each of the subsequent nodes, values of data items contained in the documents of each group are compared, and data items present in only one of the constituted groups are extracted.

3. The document group analyzing apparatus as claimed in claim 2, wherein the document has information as to whether a data item is an object of key event extraction for each kind of document, and the key event extracting unit extracts the data items indicated as objects of key event extraction.

4. A computer-implemented document group analyzing method for using in a memory, said method comprising:

locating a document specified by a searching condition in a document database that holds causally related documents;

extracting the located document, and all documents in the document database that are casually related to the located document;

collecting the extracted documents;

organizing the collected documents into a group;

classifying each of the documents in the group by kind of document;

outputting a result of the determined classification to a client; and generating a state-transition graph using the outputted result, wherein nodes are connected in sequence by the causal relation, each node being associated with one of the kinds of the documents, and a state-transition key that goes from a certain node N1 to another node N2 is expressed by a document that belongs to the kind of the document associated with the node N1, a document group that belongs to each classification generated is made into an individual state-transition graph, and common portions in a transition pattern of individual state-transition graphs of the kinds of documents are unified.

5. The document group analyzing method as claimed in claim 4, further comprising:

extracting a data item as a key event, wherein for each transition from a node branched into two or more subsequent nodes, where documents consisting of a state-transition key from the branching node and one or more state-transition keys before the branching node constitute a group, a group is constituted for each of the subsequent nodes, values of data items contained in the documents of each group are compared, and data items present in only one of the constituted groups are extracted.

6. The document group analyzing method as claimed in claim 5, wherein the document has information as to whether a data item is an object of key event extraction for each kind of document, and the extracting step extracts the data items indicated as objects of key event extraction.

7. A computer recording medium which stores a computer executable program that when executed by a computer performs a method comprising:

locating a document specified by a searching condition in a document database that holds causally related documents;

extracting the located document, and all documents in the document database that are casually related to the located document;

collecting the extracted documents;

organizing the collected documents into a group;

classifying each of the documents in the group by kind of document;

outputting a result of the determined classification to a client; and generating a state-transition graph using the outputted result, wherein nodes are connected in sequence by the causal relation, each node being associated with one of the kinds of the documents, and a state-transition key that goes from a certain node N1 to another node N2 is expressed by a document that belongs to the kind of the document associated with the node N1, a document group that belongs to each classification generated is made into an individual state-transition graph, and common portions in a transition pattern of individual state-transition graphs of the kinds of documents are unified.

8. The computer recording medium as claimed in claim 7, wherein the method further comprises:

extracting a data item as a key event, wherein for each transition from a node branched into two or more subsequent nodes, where documents consisting of a state-transition key from the branching node and one or more state-transition keys before the branching node constitute a group, a group is constituted for each of the subsequent nodes, values of data items contained in the documents of each group are compared, and data items present in only one of the constituted groups are extracted.

9. The computer recording medium as claimed in claim 8, wherein the document has information as to whether a data item is an object of key event extraction for each kind of document, and the extracting step extracts the data items indicated as objects of key event extraction.

* * * * *